Feb. 3, 1931.  J. D. ALEXANDER ET AL  1,790,785
CONVERTIBLE AIRCRAFT INCLOSURE
Filed Sept. 9, 1929   2 Sheets-Sheet 2
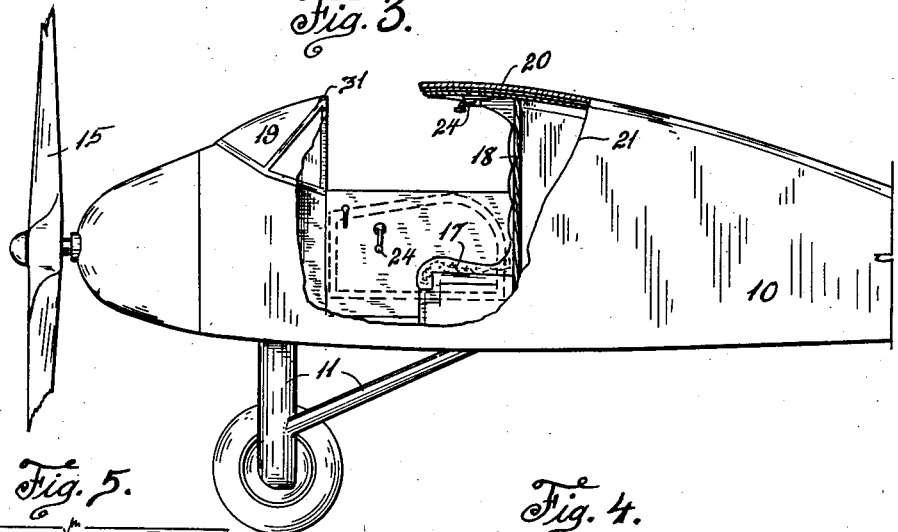
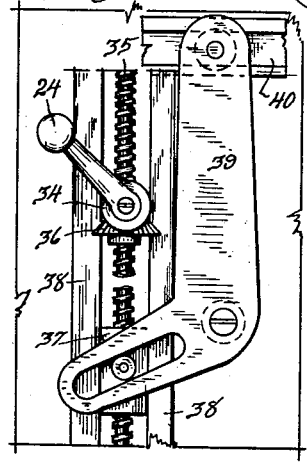
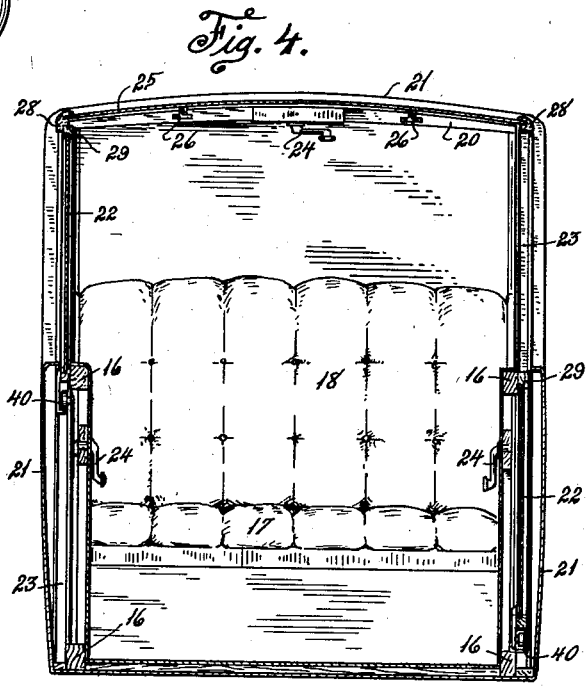
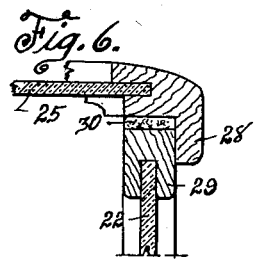
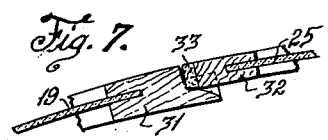
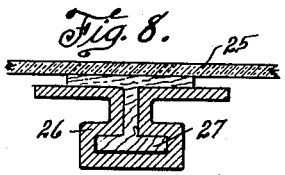
Inventors:
J. Don Alexander.
Albert W. Mooney.
By Homer L. Sweet
Attorney.

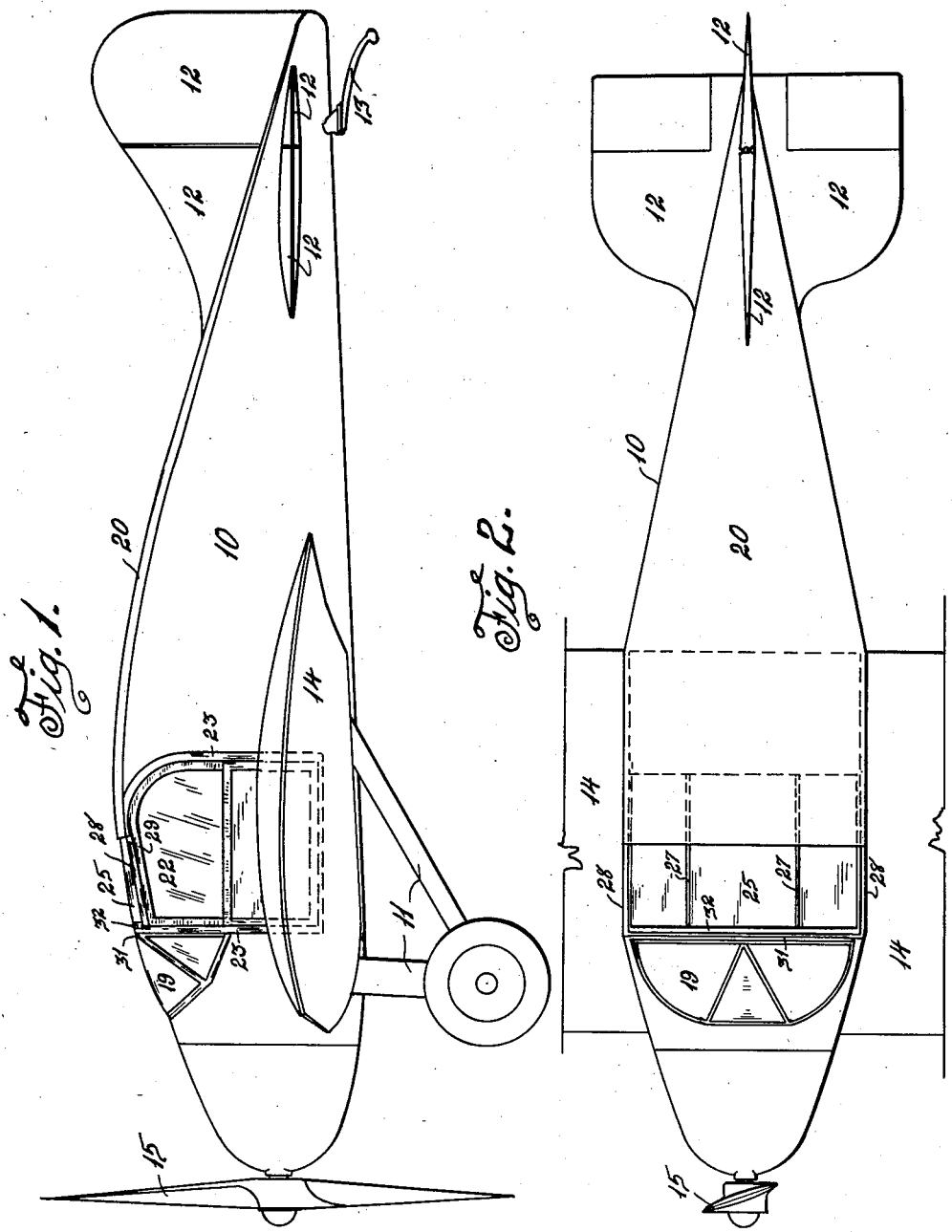

Patented Feb. 3, 1931

1,790,785

UNITED STATES PATENT OFFICE

JULIAN DON ALEXANDER AND ALBERT W. MOONEY, OF COLORADO SPRINGS, COLORADO

CONVERTIBLE AIRCRAFT INCLOSURE

Application filed September 9, 1929. Serial No. 391,206.

An object of this invention is to provide an improved aircraft inclosure.

A further object of the invention is to provide an improved aircraft inclosure readily convertible from closed to open type.

A further object of the invention is to provide an improved aircraft fuselage including a passenger compartment readily convertible from closed to open, or from open to closed, type.

A further object of the invention is to provide an improved convertible housing for the passenger compartment of an aircraft.

A further object of the invention is to provide improved means in combination with the passenger compartment of an aircraft whereby said compartment may be converted from closed to open, or from open to closed, type while said craft is in flight.

A further object of the invention is to provide an improved convertible inclosure for the passenger compartment of an aircraft, said inclosure conforming with the streamline contour of the aircraft fuselage and offering minimum resistance to the airstream effecting said craft in flight.

A further object of the invention is to provide an improved convertible inclosure for the passenger compartment of an aircraft, said inclosure providing the aircraft passengers maximum protection from the airstream and weather.

A further object of the invention is to provide an improved convertible aircraft inclosure including structural elements providing protection for the aircraft passengers in the event of crash landings.

A further object of the invention is to provide improved means operable from the passenger compartment of an aircraft in flight for converting said compartment from open to closed, or from closed to open, type.

A further object of the invention is to provide an improved convertible aircraft passenger compartment inclosure affording enhanced visibility from said compartment.

Our invention consists in the construction, arrangement and combination of elements hereinafter set forth, pointed out in our claims and illustrated by the accompanying drawings, in which—

Figure 1 is a side elevation of a conventionalized aircraft to which our invention has been applied. Figure 2 is a plan view of the showing of Figure 1, the lifting elements of the craft being broken away to conserve space. Figure 3 is a side elevation, partly in section, of the passenger compartment of the craft shown in Figures 1 and 2, showing the convertible elements of the inclosure in retracted or open position. Figure 4 is a transverse section, on an enlarged scale, through the passenger compartment of the aircraft shown in the preceding figures, looking rearwardly of said craft. Figure 5 is a fragmentary detail, on an enlarged scale, of one type of operating means for the convertible elements employed. Figure 6 is a fragmentary detail, on an enlarged scale, of the interengaging edges of the convertible elements employed in the invention. Figure 7 is a fragmentary detail, on an enlarged scale, of the cooperating edges of one of the convertible elements and a rigid element employed in the invention. Figure 8 is a fragmentary detail, on an enlarged scale, of convertible element supporting and guide means employed in the invention. Figure 9 is a fragmentary detail section, on an enlarged scale, of a guide channel employed in the invention.

In the application of the invention as shown, an aircraft of the heavier-than-air type is illustrated, conventionally, as comprising a fuselage 10 equipped with a wheeled landing carriage 11, control and stabilizing surfaces 12, a tail-skid 13, laterally-extending lifting surfaces or wings 14 and a power-driven propeller or air-screw 15, all of which is common practice and specifically no part of the instant invention, being indicative only of aircraft in general and illustrative of one adaptation and application of the invention. The fuselage 10 may be of any desired construction suitable to the purposes for which the craft is designed, and preferably includes a plurality of substantially parallel frame members or longérons 16 disposed in spaced relation longitudinally of the craft and suitably interbraced to form a load-carrying structure on which the other elements of the craft are mounted, said frame members 16 defining the side and bottom contours of the craft in ordinary practice. A passenger compartment is arranged within and between the frame members 16 intermediate the ends of the craft, as indicated by the seat 17 and backrest 18, as is conventional construction practice, the term passenger being understood to include the pilot or operator of the craft for the purposes of this invention, the seating arrangement shown in the drawings being designed to accommodate two passengers side by side, and a fixed, transparent air shield or deflector 19, preferably conforming with the desired streamlined outline of the craft, is mounted on and rises from the frame structure of the craft and extends transversely across the forward portion of the passenger compartment. Rearwardly of the passenger compartment the fuselage 10 is built up by means of suitable superstructure rising from the frame members 16 and a top frame 20, preferably conforming with the desired streamlined outline of the craft, is supported by said structure and extends forwardly across and above the rear portion of said passenger compartment to terminate in a forward edge spaced rearwardly from the rearward edge of the air shield 19. The frame thus formed by the members 16, 20 and their connecting elements is enclosed in an envelope of fabric, sheet metal, plywood or the like, as indicated by the numeral 21, said envelope extending upwardly on each side of the passenger compartment as far as the upper member 16, only, thus leaving openings between said upper members 16 and the projecting portion of the top 20 on each side of said compartment rearwardly of the air shield 19 and a top opening between said air shield 19 and top 20. The envelope 21 is spaced outwardly from the frame members 16 on each side of the passenger compartment to form vertical pockets between said frame members and envelope and vertically-adjustable windows 22 are slidably mounted in channel guides 23 vertically-disposed in spaced, parallel, opposed relation within said pockets and extending upwardly along the front and rear margins of the side apertures or openings of said compartments, manually-operable means, indicated by the numeral 24 and hereinafter more specifically described, being provided within said compartment whereby the windows 22 may be raised to close the side openings of said compartment or lowered into the pockets above described.

In a similar manner, a substantially horizontal pocket is formed in the top 20 opening through the forwardly projecting edge of said top and a slidable window 25 is mounted in said latter pocket in position to be forwardly extended therefrom to close the opening between the air shield 19 and said top 20, manually-operable means 24 being provided for the extension and retraction of said window 25. The window 25 may be supported and guided in any desired manner, one suitable supporting and guiding means being illustrated as comprising T-slots 26 in spaced, parallel relation longitudinally of the top frame 20 and I-bars 27 fixed to the window 25 engaging in and slidable relative to said T-slots 26. In order to seal the windows 22 and 25 against weather penetration when in extended position, the side bars of the window 25 may be formed with downwardly-extending, marginal flanges 28 adapted to overlap on and outside of top bars 29 of the windows 22, a strip of sealing material, such as cork or felt, indicated at 30, being carried by the top bars 29 to effectively seal the joint thus made. In like manner, the rearward edge 31 of the air shield 19 may be formed with a notch adapted to receive the front bar 32 of the window 25, said bar 32 carrying a sealing strip 33 in position to close the joint between the edge 31 and bar 32.

A number of manually-operable mechanisms for the extension and retraction of the windows 22 and 25 are known and available, and any such mechanisms may be used in the instant invention, one such mechanism being illustrated in Figure 5 as comprising the handle 24 in fixed relation with a bevel gear 34, a vertically-disposed worm 35 in fixed relation with and revoluble by a bevel gear 36 meshing with the gear 34, a vertically-movable block 37 on the worm 35 between slides 38, a pin on the block 37 engaging in the slotted end of a bell crank 39 and a roller on the other end of said bell crank engaging in a channel 40 carried by the bottom or rear bar of the windows 22 and 25. With the arrangement shown and described, operation of the handle 24 rotates the worm 35 and causes the block 37 to move up or down between the slides 38 to oscillate the bell crank 39 about its pivot and move the window-engaging end of said bell crank through a vertical arc, thus moving the window.

The arrangement shown and described has many advantages over the conventional constructions of open and enclosed aircraft. In open aircraft, though visibility is good, there is no protection for the passengers from inclement weather conditions or from crash landings. In enclosed aircraft, visibility, particularly upward, is limited and it is difficult to secure sufficient window opening to get the much desired "feel" of the air so advantageous to student flyers. The instant arrangement, however, permits of high visibility, complete protection from the weather, adequate opening for testing the performance of the craft through the "feel" of the air and protection against injury in crash landings, the forward projection of the top 20 being particularly efficient in respect of the latter. Ease of temperature regulation for the comfort of the passengers, is, of course, an added advantage of the improved arrangement.

Since the improvement is susceptible of application to a wide variety of aircraft and will, of necessity, be subject to structural modification and variation in the course of adaptation thereto, we wish to be understood as being limited solely by the scope of the appended claims, rather than by the illustrative showing and foregoing description.

We claim as our invention—

1. The combination with the enclosed fuselage of an aircraft of a passenger compartment within said fuselage, a continuous opening in the inclosure of said fuselage above and on each side of said passenger compartment and a plurality of cooperating, manually-operable, slidable panels in said fuselage inclosure adjacent said opening and moveable to close said opening at times.

2. A convertible air craft inclosure comprising an aircraft fuselage structure, a passenger compartment within said fuselage structure, a superstructure on said fuselage structure and projecting forwardly above and over a portion of said passenger compartment, an air shield fixed to said fuselage and enclosing the forward portion of said passenger compartment, covering means enclosing said fuselage structure and superstructure, a slidable panel in the projecting portion of said superstructure and forwardly-extensible to engage the upper edge of said air shield and close the top of said passenger compartment and slidable panels pocketed on either side of said passenger compartment and upwardly-extensible in marginal engagement with said air shield and superstructure into engagement with side margins of the said top panel to close the sides of said passenger compartment.

3. In an enclosed aircraft fuselage having a passenger compartment, a continuous opening in the top and upper portions of the sides of said passenger compartment and manually-operable, extensible means carried by said fuselage and movable into cooperating engagement to close said opening.

4. In an enclosed aircraft fuselage having a passenger compartment and a continuous opening transversely of said fuselage in the top and upper portions of the sides of said passenger compartment, manually-operable, cooperating means for closing said opening, said means comprising slidable panels pocketed on each side of and above said passenger compartment and extensible into marginal interengagement across said opening.

5. In an enclosed aircraft fuselage having a passenger compartment, a forwardly-projecting extension of said enclosed fuselage over and above the rear portion of said passenger compartment, an opening above the forward portion of said passenger compartment, lateral openings continuous with said top opening in the upper portions of the sides of said passenger compartment and manually-operable, slidable panels pocketed above and on each side of said passenger compartment and extensible into marginal interengagement across said openings.

6. In a structure of the character described, a passenger compartment, an opening above the forward portion of said compartment, a structural extension above and shielding the rearward portion of said compartment, openings in the upper portions of the sides of said compartment and communicating with said top opening and manually-operable, slidable panels pocketed above and on each side of said compartment and extensible into marginal interengagement across said openings.

Signed at Colorado Springs, in the county of El Paso and State of Colorado, this 17 day of April, 1929.

J. DON ALEXANDER.
ALBERT W. MOONEY.